Dec. 26, 1922.
W. KEY.
RAKE ATTACHMENT.
FILED FEB. 19, 1920.
1,439,964.
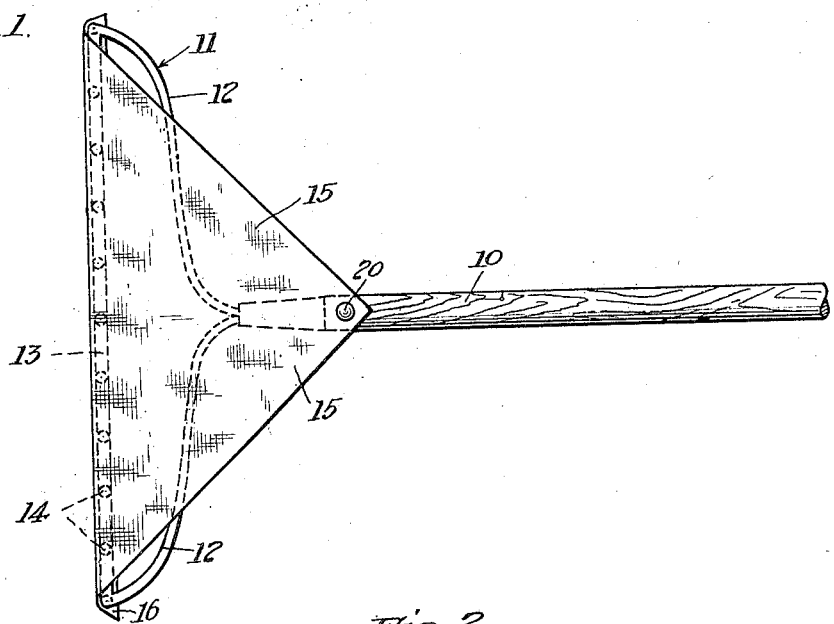
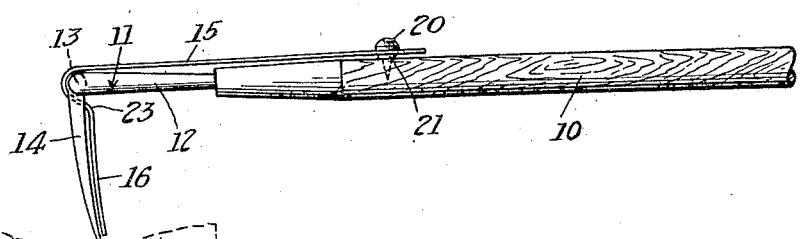
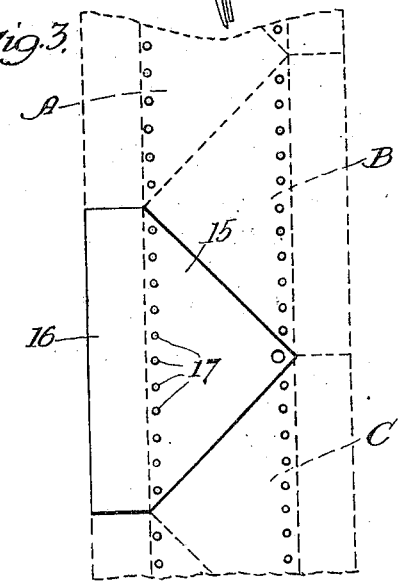
Inventor:
Walter Key.
by James T Batchelor
his Attorney Patented Dec. 26, 1922.

1,439,964

UNITED STATES PATENT OFFICE.

WALTER KEY, OF NEAR WHITTIER, CALIFORNIA.

RAKE ATTACHMENT.

Application filed February 19, 1920. Serial No. 359,804.

*To all whom it may concern:*

Be it known that I, WALTER KEY, a citizen of the United States, residing near Whittier, in the county of Los Angeles, State of California, have invented new and useful Improvements in Rake Attachments, of which the following is a specification.

This invention relates to a rake attachment and it is an object of the invention to provide a simple, inexpensive device which may be attached to an ordinary garden rake so that it can be effectively used to rake leaves, cut grass, etc.

A particular object of the invention is to provide a device that may be attached to an ordinary garden rake to make it effective in raking leaves, cut grass, or any comparatively small articles or finely divided materials.

A feature of the invention is the simplicity and cheapness of the device. The device comprises a single piece of fabric, or similar flexible material, having suitably arranged openings or apertures in it, and a single simple catch for holding it in place. The shape of the device permits of quantity production from strips of fabric without waste of material.

A further feature of the invention is the simplicity and ease with which it may be arranged in connection with or removed from a rake. The device may be placed on or removed from a rake easily, quickly and without inconvenience or delay.

Further objects and features of the invention will be best understood from the following detailed description of a preferred form of the invention throughout which reference is had to the accompanying drawings, in which—

Fig. 1 is a plan view of the end portion of a typical garden rake showing the device provided by the invention arranged thereon; Fig. 2 is a side elevation of the end portion of the rake; and Fig. 3 is a view showing the device removed from the rake and opened, or flattened, out to show its shape and also indicating the manner in which the device may be efficiently cut from a strip of fabric or material.

Throughout the drawings numeral 10 designates the handle of the rake at the lower end of which is mounted a metal frame 11. In the particular form of rake shown in the drawings the frame 11 comprises two curved arms 12, which extend outwardly from the end of the handle 10, and a cross arm 13 which extends between the outer ends of the curved arms 12, as clearly illustrated in Fig. 1. The cross arm 13 and the curved arms 12 are preferably formed integral with each other and are proportioned substantially as shown in Fig. 1 of the drawings. The cross arm 13 is at right angles with the handle 10 and has a plurality of equally spaced teeth 14 extending downwardly from it. It will be understood that the teeth 14 may be spaced various distances apart and that they may be of various shapes. For instance, they may be spaced substantially as shown in Fig. 1 and somewhat curved and pointed as shown in Fig. 2. The particular form of rake construction herein set forth is merely typical and for purpose of illustration. Therefore, it will be understood, that the device provided by the invention is not limited or restricted in any way to use or embodiment in connection with this specific form of rake but that it may be used or arranged in connection with various rakes of this general character.

The device provided by the present invention is a piece of fabric, or a canvas, as I will hereinafter term it, having a triangular shaped flap 15 and a rectangular shaped flap 16 at the base of the flap 15. A row of holes or apertures 17 is arranged at the base of the triangular flap 15, as illustrated in Fig. 4. The holes 17 are spaced the same distance apart as the teeth 14, of the rake, and are sufficiently large to receive the teeth of the rake. It is preferred although not necessary that the holes 17 be within the triangular flap 15, as shown in Fig. 3. The holes 17 may be formed in the canvas by slitting it or they may be formed by cutting small round pieces out of the canvas.

The canvas is adapted to be arranged on the rake so that the teeth 14 thereof extend through the holes 17, at the base of the triangular flap 15, causing the rectangular flap 16 to form a flap which extends downwardly at the inside of the teeth 14, while the triangular flap 15 extends around the front or outside of the cross arm 13 and then rearwardly so that its apex engages the handle 10 of the rake. It will be noted, however, in Fig. 2 of the drawings, that the canvas fits on the rake so that the base portion of the triangular flap 15 is close to, or extends around the front side of, the cross arm 13, and further that the flap 16 extends loosely downwardly in front of the teeth 14 but does not reach the lower ends of the teeth. When the device is produced in large quantities it is preferred that the strip of fabric, from which the canvases are cut, be woven so that it is particularly flexible at the base portion of the triangular flap thereby causing the flap 16 to hang freely and properly over the teeth.

The device is held in place on the rake from the apex of the triangular flap by a socket 20 at the apex of the triangular flap 15 co-operating with a projection or button 21 carried on the handle 10. It is preferred that the button 21 be located on the handle 10 so that the canvas is held fairly tight when the socket is in place on the button. It will be understood that this particular manner of attaching the apex of the flap 15 to the handle 10 is merely a typical manner in which it may be done and that various other catch or hook means may be used for this purpose.

When the canvas has been arranged on the rake in the manner above set forth the flap 16, in extending downwardly over the front of the teeth 14, prevents material that is being raked, say leaves, from passing between the teeth as would be the case if the canvas was not provided. The triangular flap 15, by extending rearwardly from the cross arm 13 to the handle 10, prevents material, say leaves, from passing over the top of the flap 16, or cross arm 13, after having been caught by the flap 16. It will be understood how the canvas when arranged in connection with a rake, makes it possible to effectively and conveniently rake leaves, and other comparatively small articles that an ordinary rake will not catch.

The canvas shown in place in Figs. 1 and 2 of the drawings is shown opened out in full lines in Fig. 3 while the dotted lines in Fig. 3 indicate the manner in which a plurality of canvases may be cut from a single strip of cloth or fabric without waste of material. By being able to cut the canvases in this manner they are extremely simple and inexpensive to manufacture. In Fig. 3 and also in Fig. 2 numeral 23 designates the base line of the triangular flap or the line along which the canvas is folded or bent so that the flap 16 hangs downwardly while flap 15 extends forward, around the front of cross arm 13, and then rearwardly. In Fig. 3 the canvases indicated at A, B and C together with the canvas shown in full lines show clearly the manner in which the canvases can be cut from a strip of material without any waste thereof and with a minimum number of cuts.

Although I have set forth the device as being canvas I do not limit myself to such material. There are numerous flexible materials and compositions that can be advantageously used in place of canvas; for instance, various fabrics or compositions, say of rubber, could be used.

Having set forth a preferred embodiment of my invention I do not wish to limit or restrict myself to the specific details hereinabove set forth but wish to reserve to myself any changes or modifications that may appear to those skilled in the art or that may fall within the scope of the following claims.

Having described a preferred form of my invention, I claim:

1. A rake attachment comprising a flap of flexible material adapted to attach to the rake to extend downwardly in front of its teeth.

2. A device adapted to attach to a rake having a cross arm, teeth on the cross arm and a handle extending rearwardly from the cross arm including, a sheet of flexible material having two flap parts and adapted to attach to the rake at the cross arm so that one flap part extends freely downwardly in front of the teeth while the other flap part extends rearwardly to attach to the handle.

3. A device adapted to attach to a rake having a cross arm, teeth on the cross arm and a handle extending rearwardly from the cross arm including, a sheet of flexible material having a substantially triangular part and a substantially rectangular part extending from the base of the triangular part; there being a plurality of openings in the sheet where the two parts join, the openings being adapted to receive the teeth so that the device can be arranged on the rake so that the rectangular part extends freely downwardly in front of the teeth while the triangular part extends over the cross arm and rearwardly to attach to the handle.

In witness that I claim the foregoing I have hereunto subscribed my name this 11th day of February, 1920.

WALTER KEY.

Witness:
VIRGINIA BERINGER.